ously to form arylene sulfide polymer and the arylene sulfide polymer formed in said reaction mixture is contacted under polymerization conditions with a polyhaloaromatic compound having more than two halogen substituents per molecule for a time having a range of up to about 75 minutes before entering upon termination of the polymerization process,

United States Patent [19]

Tieszen et al.

[11] Patent Number: 4,740,569
[45] Date of Patent: Apr. 26, 1988

[54] ARYLENE SULFIDE POLYMER, CONTACTED WITH POLYHALOAROMATIC COMPOUND

[75] Inventors: Dale O. Tieszen; Lacey E. Scoggins, both of Bartlesville, Okla.

[73] Assignee: Phillips Petroleum Company, Bartlesville, Okla.

[21] Appl. No.: 923,352

[22] Filed: Oct. 27, 1986

Related U.S. Application Data

[60] Division of Ser. No. 490,607, May 2, 1983, Pat. No. 4,656,231, which is a continuation of Ser. No. 324,304, Nov. 23, 1981, abandoned, which is a continuation-in-part of Ser. No. 261,863, May 8, 1981, Pat. No. 4,350,810, which is a division of Ser. No. 66,584, Aug. 14, 1979, Pat. No. 4,282,347.

[51] Int. Cl.$^4$ ............................................. C08G 75/14
[52] U.S. Cl. ..................................... 525/537; 528/388
[58] Field of Search ......................... 525/537; 528/388

[56] References Cited

U.S. PATENT DOCUMENTS

| 4,282,347 | 8/1981 | Tieszen et al. | 528/388 |
| 4,350,810 | 9/1982 | Tieszen et al. | 528/388 |
| 4,656,231 | 4/1987 | Tieszen et al. | 528/388 |

*Primary Examiner*—Harold D. Anderson
*Attorney, Agent, or Firm*—French and Doescher

[57] ABSTRACT

A process for the production and use of branched polymers of arylene sulfide in which (A) a reaction mixture of (1) at least one p-dihalo-benzene, (2) at least one alkali metal sulfide, (3) at least one organic amide, (4) water in an amount of about 1.0 mole to about 2.4 moles per mole of alkali metal sulfide, and (5) at least one alkali metal carboxylate is contacted under polymerization conditions for a time sufficient to form arylene sulfide polymer and the arylene sulfide polymer formed in said reaction mixture is contacted under polymerization conditions with a polyhaloaromatic compound having more than two halogen substituents per molecule for a time having a range of up to about 75 minutes before entering upon termination of the polymerization process, (B) the reaction mixture is contacted with carbon dioxide, (C) volatiles are removed from the reaction mixture, (D) arylene sulfide polymer is recovered from the reaction mixture, (E) the recovered polymer is washed, and (F) the polymer is further processed, as by molding, extruding into film or sheet, or used as a coating. An embodiment of the process in which the alkali metal sulfide is produced in situ by the reaction of an excess of alkali metal hydroxide with alkali metal hydrosulfide. An embodiment in which carbon dioxide is contacted with arylene sulfide polymer formed in the reaction mixture to stabilize the polymer. A molded object, a film, a sheet, or a coating composition that is the product of the reaction and work-up process above.

19 Claims, No Drawings

ARYLENE SULFIDE POLYMER, CONTACTED WITH POLYHALOAROMATIC COMPOUND

This application is a division of application Ser. No. 490,607, filed May 2, 1983 now U.S. Pat. No. 4,656,231 which is a continuation of application Ser. No. 324,304, filed Nov. 23, 1981, abandoned; which is a continuation-in-part of Ser. No. 261,863, filed May 8, 1981, now U.S. Pat. No. 4,350,810; which is a division of Ser. No. 066,584, filed Aug. 14, 1979, now U.S. Pat. No. 4,282,347.

BACKGROUND OF THE INVENTION

This invention relates to the production of branched arylene sulfide polymers. In accordance with one aspect of this invention it relates to a process for the production of branched arylene sulfide polymers in which a polyhaloaromatic compound having more than two halogen substituents per molecule is added to the polymerization mixture late in the polymerization process of p-dihalobenzene. In accordance with another aspect of the invention it relates to the production of branched arylene sulfide polymers suitable for further processing. In still another aspect the invention relates to further processing the polymers produced by the process of this invention. In accordance with another aspect of the invention it relates to the production of branched arylene sulfide polymers suitable for melt spinning which have good thermal aging resistance. In still another aspect the invention relates to the polymers produced by the process of this invention and to melt spun fibers of good thermal aging resistance produced therefrom. In accordance with another aspect of the invention it relates to the production of branched arylene sulfide polymers suitable for extrusion to produce film or sheet having good resistance to crystallization and that is readily convertable to an oriented product. In still another aspect the invention relates to film or sheet produced from polymer produced by the process of this invention. In accordance with another aspect of the invention it relates to the production of branched arylene sulfide polymers suitable for molding to produce molded objects having good crack resistance. In still another aspect the invention relates to molded objects produced from polymer produced by the process of this invention. In accorance with another aspect of the invention it relates to the production of branched arylene sulfide polymers suitable for use in coating applications. In still another aspect the invention relates to coating compositions containing polymers produced by the process of this invention.

As taught in U.S. Pat. No. 3,919,177, it is known that in the productio of a p-phenylene sulfide polymer by employing a p-dihalobenzene, an alkali metal sulfide, and an organic amide, the use, additionally, of an alkali metal carboxylate results in a p-phenylene sulfide polymer of higher molecular weight, as evidenced by a higher inherent viscosity and a lower melt flow, than that obtained in the absence of an alkali metal carboxylate.

In U.S. Pat. No. 4,116,947, it is disclosed that branched poly-(arylene sulfide) resins are prepared using, in addition to a p-dihalobenzene, a polyhaloaromatic compound having more than two halogen substituents per molecule which can be added to the reaction mixture after polymerization of p-dihalobenzene has begun. Polymers of low melt flow suitable for spinning into fibers are thus prepared.

The present invention provides branched arylene sulfide polymers which possess sufficiently low melt flow for molding, extruding or spinning into fibers and which, because of the addition of polyhaloaromatic compound within a specified period late in the polymerization process for p-dihalobenzene, exhibit superior thermal stability to those branched arylene sulfide polymers prepared by initial addition of the polyhaloaromatic compound. The process of the present invention also provides better control of melt flow than do prior art processes for making fiber-quality linear arylene sulfide polymers, extrudable arylene sulfide polymers, moldable arylene sulfide polymers, and curable arylene sulfide polymers suitable as coatings.

Accordingly, it is an object of this invention to provide an improved process for the production of branched arylene sulfide polymers.

A further object of the invention is to provide branched arylene sulfide polymers suitable for further processing.

A further object of the invention is to provide branched arylene sulfide polymers suitable for melt spinning into fiber of good thermal aging resistance.

A further object of the invention is to provide branched arylene sulfide polymers suitable for extrusion to produce film or sheet having good resistance to crystallization and that is readily convertible to an oriented product.

A further object of the invention is to provide branched arylene sulfide polymers suitable for molding to produce molded objects having good crack resistance.

A further object of the invention is to provide branched arylene sulfide polymers suitable for use in coating applications.

Other objects, aspects, and the several advantages of this invention will be apparent to those skilled in the art upon a study of the specification and the appended claims.

In accordance with this invention, branched arylene sulfide polymers are produced by contacting under polymerization conditions for a time sufficient to form arylane sulfide polymer a reaction mixture of (1) at least one p-dihalobenzene; (2) at least one alkali metal sulfide; (3) at least one organic amide; (4) water in an amount of about 1.0 mole to about 2.4 moles per mole of alkali metal sulfide, said amount including water of hydration; and (5) at least one alkali metal carboxylate; and contacting under polymerization conditions a polyhaloaromatic compound having more than two halogen constituents per molecule with the arylene sulfide polymer formed in the reaction mixture with the contacting of polyhaloaromatic compound in an amount sufficient to produce branched polymer and for a time having a time range of up to about 75 minutes before entering upon termination of the polymerization process. The resulting polymers, without prior curing, can be molded, extruded, or spun into fibers.

In another embodiment of the invention carbon dioxide is added to the arylene sulfide polymer formed in the reaction mixture to stabilize the resultant polymer relative to thermal degradation during product recovery.

In still another embodiment of the invention termination of the polymerization process is entered upon by the commencement of distillation of volatiles from the polymerization mixture.

p-Dihalobenzenes which can be employed in the process of this invention can be represented by the formula

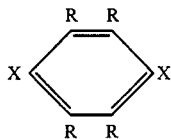

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4, 5-tetramethyl-3,6-dichlorobenzene, 1-butly-4-cyclohexyl-2,5-dibromobenzene, 1-hexyl-3-dodecyl-2,5-dichlorobenzene, 1-octadecyl-2, 5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorobenzene, and the like, and mixtures thereof.

Polyhaloaromatic compounds useful in the practice of this invention are those having more than two halogen substituents per molecule which can be utilized in preparing branched polymers. They can be represented by the formula $R'X_n$, where each X is selected from the group consisting of chlorine, bromine, and iodine, n is an integer of 3 to 6, and $R'$ is a polyvalent aromatic radical of valence n which can have up to about 4 methyl substituents, the total number of carbon atoms in $R'$ being within the range of 6 to about 16.

Examples of some polyhaloaromatic compounds having more than two halogen substituents per molecule which can be employed in the process of this invention include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetraiodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and the mixtures thereof.

Alkali metal sulfides which can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. If desired, the alkali metal sulfide can be produced by reaction of hydrogen sulfide or alkali metal bisulfide with alkali metal hydroxide in an aqueous medium. However, when the amount of free water and/or water of hydration present exceeds that specified hereinabove, excess water must be removed, e.g., by distillation, prior to the polymerization step. The invention encompasses the in situ production of alkali metal sulfide in the reaction mixture with the reaction of an excess of alkali metal hydroxide with alkali metal bisulfide being a preferred operation.

The organic amides used in the method of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethyl-formamide, N,N-dimethylacetamide, N-ethylpropionamide, N,N-dipropyl-butyramide, 2-pyrrolidone, N-methyl-2-pyrrolidone, ε-caprolactam, N-methyl-ε-caprolactam, N,N'-ethylenedi-2-pyrrolidone, hexamethyl-phosphoramide, tetramethylurea, and the like and mixtures thereof. N-Methyl-2-pyrrolidone is preferred.

Alkali metal hydroxides which can be employed in the process of this invention include lithium hydroxide, sodium hydroxide, pottassium hydroxide, rubidium hydroxide, cesium hydroxide, and mixtures thereof.

Alkali metal carboxylates which can be employed in the process of this invention can be represented by the formula $R^4CO_2M$, where $R^4$ is a hydrocarbyl radical selected by alkyl, cycloalkyl, and aryl, and combinations thereof such as alkaryl, aralkyl, and the like, and the number of carbon atoms in $R^4$ is within the range of 1 to about 20 and M is an alkali metal. If desired, the alkali metal carboxylate can be employed as a hydrate or as a solution or dispersion in water. However, if the total amount of free water and/or water of hydration present, including that associated with the alkali metal sulfide, exceeds the amount specified hereinabove, excess water must be removed, e.g., by distillation, prior to the polymerization step.

Examples of some alkali metal carboxylates which can be employed in the process of this invention include sodium acetate, sodium propionate, potassium 2-methylpropionate, cesium butyrate, sodium valerate, rubidium hexanoate, sodium heptanoate, sodium 2-methyl-octanoate, sodium dodecanoate, potassium 4-ethyltetradecanoate, sodium octadecanoate, sodium heneicosanoate, cesium cyclohexane-carboxylate, sodium cyclododecanecarboxylate, sodium 3-methylcyclopentane-carboxylate, sodium, cyclohexylacetate, sodium benzoate, sodium m-toluate, sodium phenylacetate, sodium 4-phenylcyclohexanecarboxylate, sodium p-tolylacetate, sodium 4-ethylcyclohexylacetate, and the like, and mixtures thereof.

Although the mole ratio of p-dihalobenzene to alkali metal sulfide can vary somewhat, generally it will be within the range of about 0.9:1 to about 2:1, preferably within the range of about 0.95:1 to about 1.2:1. The amount of polyhaloaromatic compound having more than two halogen substituents per molecule can vary considerably, depending in part on the halogen content of said polyhaloaromatic compound and on the water and alkali metal carboxylate content of the polymerization system, but generally it will be used in an amount up to about 0.6 part by weight per 100 parts by weight p-dihalobenzene, preferably about 0.05 to about 0.4 part by weight per 100 parts by weight p-dihalobenzene.

The mole ratio of alkali metal carboxylate to alkali metal sulfide can vary over a wide range, but generally will be within the range of about 0.05:1 to about 4:1, preferably within the range of about 0.1:1 to about 2:1. The mole ratio of alkali metal hydroxide in excess of that required to react with alkali metal bisulfide to yield alkali metal sulfide can vary over a wide range, but generally will be within the range of about 0.008:1 to about 1:1, preferably about 0.015:1 to about 0.6:1.

The mole ratio of organic amide to alkali metal sulfide can vary considerably, but generally will be within the range of about 2:1 to about 10:1, preferably within the range of about 3:1 to about 6:1.

In the process of this invention it is desirable that a dehydration step, i.e., distillation of water, be conducted on a mixture comprising an alkali metal bisulfide and organic amide, preferably together with an alkali metal hydroxide. Although the alkali metal carboxylate can be added before or after the dehydration step, it is preferable to add it before the dehydration. When the alkali metal carboxylate in hydrated form is employed, it is preferable that this salt forming a composition with organic amide be dehydrated in one step to form a first dehydrated composition, followed by addition of the alkali metal hydroxide and the alkali metal bisulfide in hydrated form or as an aqueous mixture to form a second composition and then a second dehydration step be carried out to form a second dehydrated composition. When carried out in two steps, the dehydration is conducted with less foaming than is encountered when the dehydration is conducted in a single step. In the process of this invention the p-dihalobenzene is most practically added after the dehydration step(s).

Although the reaction temperature at which the polymerization is conducted can vary over a wide range, generally it will be within the range of about 180° C. to about 285° C., preferably within the range of about 190° C. to about 275° C. The reaction time can vary greatly, depending in part on the reaction temperature, but generally will be within the range of about 1 hour to about 60 hours, preferably within the range of about 2 hours to about 10 hours. In a presently preferred procedure, the polymerization is conducted within a first temperature range of about 180° C. to about 245° C., preferably from about 190° C. to about 245° C., and then within a second temperature range of about 245° C. to about 285° C. preferably about 245° C. to about 275° C., the total reaction time for the polymerization in these two temperature ranges being within the range of about 1 hour to about 60 hours, preferably about 2 hours to about 10 hours, about 15 percent to about 70 percent of which time is within the first temperature range, the temperature during at least 50 percent of the reaction time in the first temperature range being at least 20° C. below the final temperature in the second temperature range. Here, too, the reaction times are dependent, in part, on the reaction temperatures. In either or both of the temperature ranges, the temperature can be increased continuously or maintained predominantly at selected levels within relatively restricted temperature limits.

The pressure at which the polymerization reaction is conducted should be sufficient to maintain the p-dihalobenzene, the polyhaloaromatic compounds having more than two halogen substituents per molecule, the organic amide, and the water substantially in the liquid phase.

If desired, e.g., in order to stabilize the resultant polymer relative to thermal degradation during product recovery, carbon dioxide can be applied to the polymerization mixture at or near completion of the polymerization step in a manner similar to that described in U.S. Pat. No. 4,038,262, preferably within a time ranging up to about an hour before entering on termination of the polymerization process.

The amount of carbon dioxide can vary over a wide range, but will generally be in the range of 1:10 to 20:1 moles per mole of alkali metal hydroxide in excess of that required to react with alkali metal bisulfide, a preferred range is 1:1 to 10:1 moles per mole of excess alkali metal hydroxide.

A currently preferred embodiment of the invention employs carbon dioxide added near the end of the above described higher temperature stage of the two temperature stage polymerization process and the polyhaloaromatic compound added not only within the time range of 30 minutes before to 30 minutes after the carbon dioxide addition, but also before the removal of volatiles, as by distillation, and concentration of the polymerization mixture.

It is also within the scope of this invention to employ a process in which the above-described treatment with carbon dioxide is not utilized. Whether or not carbon dioxide treatment is employed, the polyhaloaromatic compound must be added to the polymerization mixture at a time sufficiently before polymerization is terminated to allow the formation of branched polymer. Generally this is in a time range up to about 75 minutes before entering upon termination of the polymerization process—which, in the presently preferred, integrated process, is signalled by commencement of distillation of volatiles—to the moment of commencement of distillation of volatiles from the polymerization mixture, preferably up to one hour before volatile distillation is begun. It must be recognized that in this process the commencement of distillation of volatiles does not immediately terminate the polymerization thereby necessitating the terminology "entering upon termination of the polymerization process" as the point in time from which the period for addition of polyhaloaromatic compound is measured. If other means are used for terminating the reaction, the time limitation for addition of the carbon dioxide is still necessary.

In a presently preferred recovery step, after the polymerization step, addition of polyhaloaromatic and the optional addition of carbon dioxide have been completed, the N-methyl-2-pyrrolidone, as well as any water which is present, is distilled, and the residual product is washed with water and dried to yield the desired arylene sulfide polymer. In an especially preferred procedure, distillation of the N-methyl-2-pyrrolidone and any water therein is conducted in a manner similar to that used in U.S. Pat. No. 3,839,302. For example, the polymerization reaction mixture at an initial temperature within the range of about 220° C. to about 330° C. can be concentrated by reducing the pressure sufficiently, to distill some of the N-methyl-2-pyrrolidone and any water present, e.g., to a pressure usually within the range of about 0 psig to about 180 psig. Steam can then be passed into the residual mixture if desired, e.g., to a pressure of 140–160 psig, to inhibit discoloration during further processing. The mixture can then be reheated to a temperature within the range of about 220° C. to about 330° C. under autogenous pressure. The pressure on the mixture can then be reduced to approximately atmospheric pressure to distill the water and most of the remaining N-methyl-2-pyrrolidone. Remaining N-methyl-2-pyrrolidone can be evaporated readily by heating the residual product, e.g., at a temperature within the range of about 205° C. to about 250° C., after which the residual product can be washed with water to remove inorganic salt and dried, thereby providing the arylene sulfide polymer in substantially pure form. N-Methyl-2-pyrrolidone recovered from the polymerization reaction mixture can be recycled to the polymerization reactor.

The arylene sulfide polymers produced by the process of this invention can be blended with fillers, pigments, extenders, other polymers, and the like. They can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers. Those arylene sulfide polymers having a relatively low melt flow, e.g., within the range of about 1 to about 700 (determined by the method of ASTM D 1238-70, modified to a temperature of 316° C. using a 5-kg weight, the value being expressed as g/10 min), are particularly useful in the production of fibers, molded objects, and films since the usual curing step is obviated.

The branched arylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer.

EXAMPLE I

This example describes the preparation of film-grade poly(phenylene sulfide) (PPS) from sodium sulfide; N-methylpyrrolidone (NMP); sodium acetate; p-dichlorobenzene (DCB); 1,2,4-trichlorobenzene (TCB), added both toward the end of the polymerization reaction by the inventive process and simultaneously with the DCB addition in control runs; and carbon dioxide, added at the end of the polymerization reaction. A representative polymerization run was carried out in a PPS pilot plant.

In a representative run according to the invention, 23.5 lb. of solid sodium acetate and 25.7 gallons of NMP were charged to the reactor, which was subsequently purged three times with nitrogen. A solution of sodium sulfide was prepared by premixing 72.2 lb. of an aqueous solution containing 50.35 weight percent of NaOH and 87.3 lb of an aqueous solution containing 58.91 weight percent of NaHS and 0.62 weight percent of $Na_2S$ and was then added to the reactor, which was then flushed with 8 gallons of NMP. Dehydration was carried out for about 105 minutes at a constant gauge pressure of 17 psig and a temperature ranging from 333° F. (initial) to 450° F. (final).

132.5 lb of p-dichlorobenzene (DCB) were charged at a reactor temperature of 440° F. and a reactor pressure of 30 psig. The polymerization of DCB with sodium sulfide was carried out for about 3.5 hours at a temperature ranging from 440° F. to 510° F. (final) and a pressure ranging from 30 psig to 142 psig (final). Then 90 ml of 1,2,4,-trichlorobenzene (TCB) dissolved in 2 gallons of NMP were added, and the polymerization was continued for about 1 hour at 510° F. and a pressure of 155 to 162 psig. Subsequently, the reactor mixture was treated with carbon dioxide (approximately 60 psig) at 510° F. and a total reactor pressure at 220 to 225 psig for thirty minutes.

The reactor pressure was lowered to 160 psig for 10 minutes thereby removing volatiles and concentrating the reaction mixture. The PPS polymer was recovered, washed three times with cold deionized water, and dried.

Similarly, in control runs, TCB was added to the reactor essentially simultaneously with DCB at the beginning of the polymerization reaction. All other reaction variables were essentially the same in the invention runs and the control runs.

EXAMPLE II

Poly-phenylene sulfide) resin prepared in accordance with the procedure described in Example I and oven-dried at 350° F. for 5 hours was extruded on an NRM extruder of 1" diameter equipped with a water quench bath and pelletizer, at a die temperature of 600° F. and a rotor speed of 55 rpm. The extruded strands were chopped and dried in a vacuum oven at 212°–248° F. and then extruded on a 1" NRM extruder through a slot die having a temperature of 608° F. The extruded film was passed through a pair of pressure rolls having a temperature of 163° F. and collected. The appearance rating of the extruded, gold-colored film was "4–5", based on the following scale: 1, covered with bubbles; 2, many bubbles; 3, bubbles easily noticeable; 4, few small bubbles; 5, no bubbles.

It was observed that PPS resin prepared by the addition of 1,2,4-trichlorobenzene toward the end of the polymerization and final carbon dioxide treatment generally exhibits a melt crystallization temperature (Tmc; determined by a differential scanning calorimeter upon cooling of the melt) that is about 10° C. lower than the Tmc of PPS resin prepared by simultaneous addition of p-dichlorobenzene and 1,2,4-trichlorobenzene (TCB) to the PPS reactor at comparable TCB level. This effect is shown for representative runs in Table I.

The generally lower melt crystallization temperature indicating a lower crystallization rate of poly(phenylene sulfide) made according to the invention is advantageous for film extrusion since more time is available for the biaxial orientation of the film before it crystallizes.

TABLE I

| Run | Mole Ratio TCB/$Na_2S$ | Polymer Melt Flow Rate[a] | Tmc[b], °C. |
|---|---|---|---|
| 1 (Invention) | 0.0020 | 24 | 193 |
| 2 (Invention) | 0.0021 | 69 | 191 |
| 3 (Invention) | 0.0028 | 66 | 194 |
| 4 (Control) | 0.0026 | 21 | 201 |
| 5 (Control) | 0.0020 | 30 | 203 |
| 6 (Control) | 0.0026 | 62 | 207 |

[a]determined according to a modified ASTM D1238 method employing an orifice of 0.0825" diameter and 0.315" length and an effective weight (including piston) of 5.0 kg, at 316° C.
[b]determined with a Perkin Elmer DSC-2C differential scanning calorimeter; cooling of the polymer melt starts at 320° C.

EXAMPLE III

This example describes the preparation of PPS resin suitable for molding applications both with addition of TCB near the end of the polymerization reaction and simultaneously with the DCB addition.

23.5 lb of sodium acetate and 25.7 gallons of NMP were charged to a PPS pilot plant reactor, which was then purged three times with nitrogen. A sodium sulfide solution was prepared by mixing 72.2 lb of an aqueous 50.5 weight-% NaOH solution and an aqueous solution containing 58.91 weight-% of NaHS and 0.62 weight-% of NaHS. This solution was charged with 8.0 gallons of NMP to the reactor. Dehydration of the reactor content was carried out for 90 minutes at 17 psig and a temperature ranging from 337° F. to 445° F. (final peak temperature). 131.6 lb of p-dichlorobenzene (DCB) were added, and the reactor mixture was heated for about 3.5 hours (temperature: 436° F. to 510° F.; pressure: 27 psig to 155 psig). Then 157 ml of TCB and 2 gallons of NMP were added. Four minutes later 65 psi of carbon dioxide was introduced at 502° F. resulting in a total reactor pressure of 220 psig. The $CO_2$ treatment lasted 30 minutes.

Subsequently, the pressure was gradually reduced to 45 psig during a 1.5 hour period so that the liquid components could be flashed off. Solvent flashing was completed by heating up to 540° F.

For control runs TCB was added to the reactor essentially simultaneously with DCB at the beginning of the polymerization reaction. All other reaction variables were essentially the same in the invention runs and the control runs.

EXAMPLE IV

In this example the corresponding of poly(phenylene sulfide) prepared according to the procedure of Example III for molding applications and cracking tests is described. Molding compounds were prepared according to the following recipe:

1767 grams of PPS
1200 grams of Owens Corning 497 AA fiber glass (chopped strands; ¼" length)
30.0 grams of lithium carbonate
3.0 grams of zinc stearate.

These components were mixed in a drum tumbler for 5 minutes and then compounded using a Davis-Standard 1½ inch extruder with a compounding screw at 600° F. and a screw speed of 100 r.p.m. The cooled compounds were injection molded for cracking tests after drying at 350° F. for 3-6 hours. Injection molding was carried out in a New Britain 75 B injection molding machine having a disc mold of 2" diameter and ½" thickness, at a mold temperature of 100° F., a barrel temperature of 600° F., an injection time of 5 seconds, an injection hold time of 18 seconds, a cooling time of 150 seconds, an injection pressure of 1000 psi, a hold pressure of 1000 psi, and a cushion thickness of ¼".

18 discs were molded from each compound and treated after cooling as follows: one disc was left as molded; one disc was annealed at 400° F. for two hours for surface examination; 8 discs were sawed so as to provide 16 discs of ¼" thickness each of which was annealed for 2 hours and allowed to cool for crack examination; 8 discs were annealed at 400° F. for 2 hours, allowed to cool to room temperature for 2 hours, and examined for cracks after 24 hours.

EXAMPLE V

Evaluation data for PPS resin and molded discs prepared according to the procedure described in Example V are summarized in Table II. Data clearly show that discs prepared from molded, annealed compounds containing the PPS produced by the invention process were more crack-resistant than those containing PPS produced with simultaneous addition of DCB and TCB. Surface blistering was observed more frequently for inventive runs than for control runs. Melt crystallization temperature Tmc was generally lower for inventive PPS than for control resins having approximately the same melt flow rate. Compare run 7 to 12, 9 to 13, 11 to 14.

TABLE II

| Run[a] | Polymer Melt[b] Flow Rate | Tmc[c] Degrees C. | Cracking[d] Results | Surface[e] Blistering |
|---|---|---|---|---|
| 7 (Invention) | 95 | 192 | 1 failed | Yes |
| 8 (Invention) | 79 | 187 | 0 failed | Yes |
| 9 (Invention) | 49 | 181 | 7 failed | No |
| 10 (Invention) | 44 | 188 | 0 failed | Yes |
| 11 (Invention) | 25 | 178 | 0 failed | Yes |
| 12 (Control) | 120 | 187 | 8 failed | No |
| 13 (Control) | 52 | 186 | 8 failed | Yes |
| 14 (Control) | 25 | 189 | 2 failed | No |
| 15 (Control) | 18 | 194 | 2 failed | No |

[a] all PPS polymer samples contained 0.3 mole percent of TCB
[b] see footnote to Table I
[c] see footnote to Table I, except that the polymer melt was cooled from 360° C.
[d] 16 molded discs were examined for cracks
[e] observed on a molded disc annealed for 2 hours at 400° F.

We claim:

1. A process for the production of a branched arylene sulfide polymer said process comprising:
   (a) contacting under polymerization conditions for a time sufficient to form an arylene sulfide polymer a reaction mixture comprising:
      (1) at least one p-dihalobenzene;
      (2) at least one alkali metal sulfide;
      (3) at least one organic amide;
      (4) water in an amount of about 1.0 mole to about 2.4 moles per mole of alkali metal sulfide, said amount including water of hydration; and
      (5) at least one alkali metal carboxylate;
   (b) contacting with said arylene sulfide polymer formed in said reaction mixture, under polymerization conditions, an amount of polyhaloaromatic compound having more than 2 halogen substitutes per molecule sufficient to produce branched arylene sulfide polymer and for a time up to about 75 minutes before entering upon termination of the polymerization process said time sufficient to produce branched arylene sulfide polymer;
   (c) recovering said branched arylene sulfide polymer from the reaction mixture, and
   (d) further processing said recovered branched arylene sulfide polymer by a method comprising molding, extruding a film, extruding a sheet or preparing a coating composition.

2. A process according to claim 1 further comprising the steps of
   removing volatiles from the reaction mixture in which the arylene sulfide polymer was formed; and
   washing the arylene sulfide polymer recovered from the reaction mixture.

3. A process according to claim 1 wherein a polymerization is carried out at two different temperature levels with the polymerization conducted within a first temperature range of about 180° C. to about 245° C. and then within a second temperature range of about 245° C. to about 285° C. with the proviso that about 15 percent to about 70 percent of the total reaction time is within the first temperature range and the temperature during at least 50 percent of the reaction time in the first temperature range is at least 20° C. below the final temperature in the second temperature range.

4. A process according to claim 1 wherein said alkali metal sulfide is produced in situ in the reaction mixture by the reaction of alkali metal hydroxide with alkali metal bisulfide.

5. A process according to claim 3 wherein said alkali metal sulfide is produced in situ in the reaction mixture by the reaction of alkali metal hydroxide with alkali metal bisulfide.

6. A process according to claim 1 wherein alkali metal hydroxide is present in a mole ratio of alkali metal hydroxide in excess of that required to react with alkali metal bisulfide to yield said alkali metal sulfide within a range of about 0.008:1 to about 1:1.

7. A process according to claim 3 wherein alkali metal hydroxide is present in a mole ratio of alkali metal hydroxide in excess of that required to react with alkali metal bisulfide to yield said alkali metal sulfide within a range of about 0.008:1 to about 1:1.

8. A process according to claim 1 wherein the mole ratio of said p-dihalobenzene to said alkali metal sulfide is within the range of about 0.9:1 to about 2:1; the mole ratio of said organic amide to said alkali metal sulfide is in the range of about 2:1 to about 10:1; the mole ratio of said alkali metal carboxylate to said alkali metal sulfide is within the range of about 0.05:1 to about 4:1 and the amount of said polyhaloaromatic compound having more than two halogen substituents per molecule is generally in an amount of up to about 0.6 parts by weight per 100 parts by weight of said p-dihalobenzene.

9. A process according to claim 3 wherein the mole ratio of said p-dihalobenzene to said alkali metal sulfide is within the range of about 0.9:1 to about 2:1; the mole ratio of said organic amide to said alkali metal sulfide is in the range of about 2:1 to about 10:1; the mole ratio of said alkali metal carboxylate to said alkali metal sulfide is within the range of about 0.05:1 to about 4:1 and the amount of said polyhaloaromatic compound having more than two halogen substituents per molecule is generally in an amount of up to about 0.6 parts by weight per 100 parts by weight of said p-dihalobenzene.

10. A process according to claim 6 wherein said p-dihalobenzene is p-dichlorobenzene, said alkali metal sulfide is sodium sulfide produced in situ by the reaction of an excess of sodium hydroxide with sodium hydrosulfide, said organic amide is N-methyl-2-pyrrolidone, said alkali metal carboxylate is sodium acetate and said polyhaloaromatic compound having more than two halogen constituents per molecule is 1,2,4-trichlorobenzene.

11. A process according to claim 7 wherein said p-dihalobenzene is p-dichlorobenzene, said alkali metal sulfide is sodium sulfide produced in situ by the reaction of an excess of sodium hydroxide with sodium hydrosulfide, said organic amide is N-methyl-2-pyrrolidone, said alkali metal carbyoxylate is sodium acetate and said polyaloaromatic compound having more than two halogen constituents per molecule is 1,2,4-trichlorobenzene.

12. A process according to claim 1 wherein the further processing is molding.

13. A process according to claim 1 wherein the further processing is extruding.

14. A process according to claim 1 wherein the further processing is preparing a coating composition.

15. An article of manufacture selected from molded articles, extruded films, extruded sheets and coating compositions produced from the branched polymer prepared by a method comprising the steps of:
    (a) contacting under polymerization conditions for a time sufficient to form an arylene sulfide polymer a reaction mixture comprising:
        (1) at least one p-dihalobenzene;
        (2) at least one alkali metal sulfide;
        (3) at least one organic amide;
        (4) water in an amount of about 1.0 mole to about 2.4 moles per mole of alkali metal sulfide, said amount including water of hydration; and
        (5) at least one alkali metal carboxylate;
    (b) contacting with said arylene sulfide polymer formed in said reaction mixture, under polymerization conditions, an amount of polyaloaromatic compound having more than 2 halogen substitutes per molecule sufficient to produce branched arylene sulfide polymer and for a time up to about 75 minutes before entering upon termination of the polymerization process said time sufficient to produce branched arylene sulfide polymer;
    (c) recovering said branched arylene sulfide polymer from the reaction mixture.

16. An article of manufacture produced by the method of claim 1.

17. A molded article of manufacture produced by the method of claim 12.

18. An article of manufacture produced by the method of claim 13.

19. A coating composition produced by the method of claim 14.

* * * * *